United States Patent [19]

Baldassari

[11] 4,069,033
[45] Jan. 17, 1978

[54] EXTRACTION OF FERTILIZER SALTS AND ORGANIC SUBSTANCES OF HIGH NUTRITIVE VALUE FROM INDUSTRIAL WASTE WATERS

[75] Inventor: Paolo Baldassari, Reggio Emilia, Italy

[73] Assignee: Reggiane Officine Meccaniche Italiane S.p.A., Milan, Italy

[21] Appl. No.: 614,966

[22] Filed: Sept. 19, 1975

[30] Foreign Application Priority Data

Sept. 30, 1974 Italy .................................. 3488/74

[51] Int. Cl.² ............................................. C05F 7/00
[52] U.S. Cl. ........................................... 71/25; 71/26; 71/33; 71/54; 159/47 WL; 210/42 R; 210/51; 426/636
[58] Field of Search .................................. 210/42–56; 71/24, 25, 26, 33, 37, 54; 159/1 W, 47 WL

[56] References Cited

U.S. PATENT DOCUMENTS

| | | | |
|---|---|---|---|
| 3,171,804 | 3/1965 | Rice | 210/51 X |
| 3,236,766 | 2/1966 | Levin | 210/51 |
| 3,605,775 | 9/1971 | Zaander et al. | 210/42 X |
| 3,650,686 | 3/1972 | Hudson et al. | 210/42 X |
| 3,725,263 | 4/1973 | Harris et al. | 210/42 |
| 3,865,568 | 2/1975 | Kratzer | 210/45 X |
| 3,936,375 | 2/1976 | Nettli | 210/52 X |

Primary Examiner—Charles N. Hart
Assistant Examiner—Ferris H. Lander
Attorney, Agent, or Firm—Browdy and Neimark

[57] ABSTRACT

A process for obtaining fertilizer salts and organic substance concentrates of high nutritive value from industrial waste waters, in particular of waste waters of the agricultural, food processing and food preserving industries, with a high content of Totally Dissolved Solids (T.D.S.), includes the following operating phases:

Automatic diversion of the high T.D.S. content waste waters from those of low T.D.S. content by means of a conductivity or density measuring instrument.

Mixing of the high T.D.S. content waste waters with strong acids or bases, according to the composition of the waste waters, so as to form stable salts.

Filtration of the so-formed solution for the purpose of eliminating the insoluble substances and precipitates.

Concentration of the solution by means of evaporation.

Crystallization of the concentrated solution.

Separation by means of centrifugation of the fertilizer salts from the mother liquors containing organic substances of high nutritive value.

8 Claims, 1 Drawing Figure

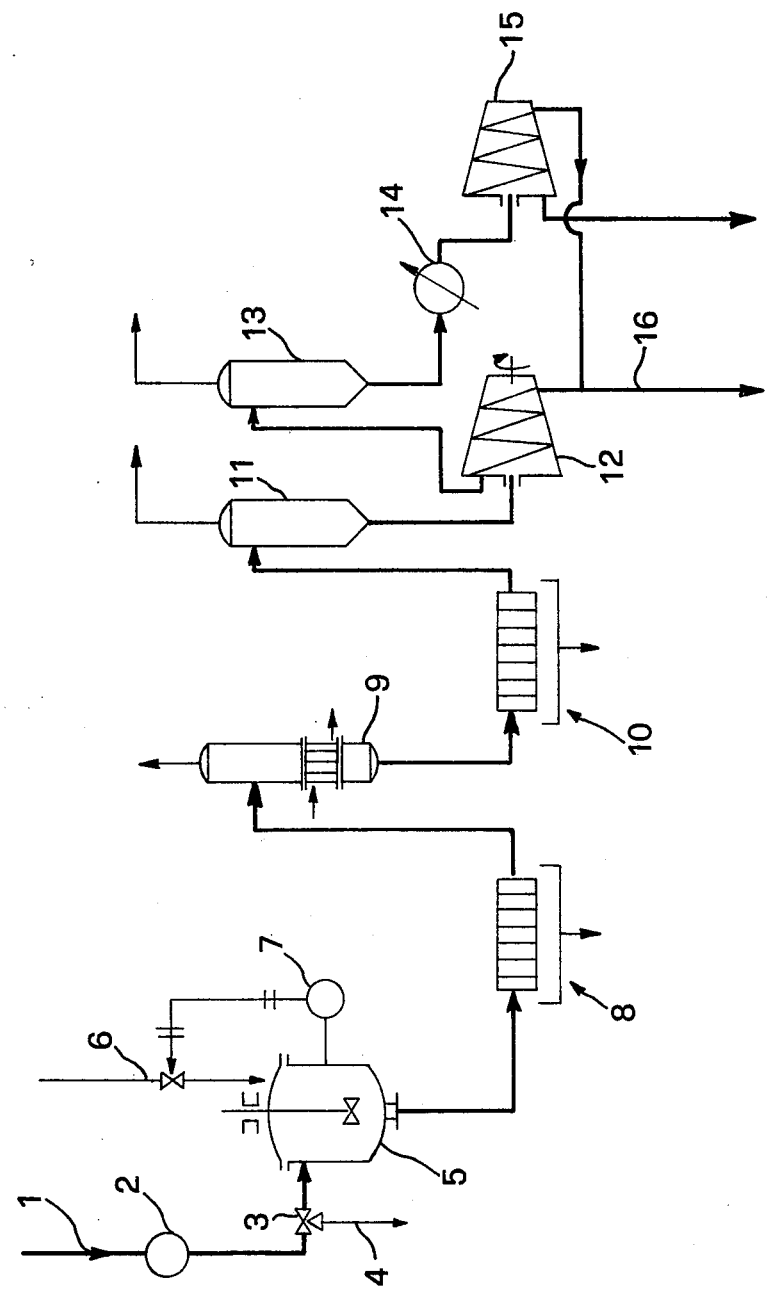

EXTRACTION OF FERTILIZER SALTS AND ORGANIC SUBSTANCES OF HIGH NUTRITIVE VALUE FROM INDUSTRIAL WASTE WATERS

BACKGROUND OF THE INVENTION

The present invention relates to a process for extracting fertilizer salts and organic substance concentrates of high nutritive value from ndustrial waste waters.

In particular, this process relates to waste waters of the agricultural, food-processing and food preserving industries where these waste waters have a high content of Totally Dissolved Solids (T.D.S.).

DESCRIPTION OF THE PRIOR ART

The known treatments of wate water refer mainly to the depuration of these waste waters and less to the problem of the recovery of useful substances contained therein.

In most of the known processes, the waste waters of such industries are subjected to a biological treatment resulting in the formation of humid sludges, the dehydration of which presents serious difficulties.

Such processes are therefore characterized by the difficulty encountered in getting rid of the sludges which are often putrescible because of the organic substances they contain and toxic because of the presence of certain inorganic substances.

In addition, the industries very often have to discharge waste waters of a high T.D.S. content. If these waste waters are conveyed to a biological purification plant together with other waste waters, the situation becomes still more complex with the necessity of having to strengthen the purification plant. Furthermore, in certain cases, the addition of these high T.D. S. content waste waters causs such a high degree of pollution that the purification on the basis of the known methods becomes impossible.

The reuse of such waste waters has up to now been limited to only a partial and rather awkward application of the same.

In some industries the waste waters are directly used as fertilizing agents without any intermediate treatment, others are used as additives for fodder. Until now no plant or system has been realized allowing the rational recovery of the useful substances contained in the waste waters of agricultural, food-processing and food-preserving industries.

SUMMARY OF THE INVENTION

The principal object of the present invention is to permit the separation of high T.D.S. content waste waters from low T.D.S. content waste waters, the latter being then treated with conventional biological methods, while the high T.D.S. content waste waters are subjected to a series of successive operations allowing to obtain the following end products: organic concentrates to be used as additives for fodder and fertilizing salts.

The main object of this invention is therefore:

1. to separate the high T.D.S. content waste waters from the low T.D.S. content waste waters to render the purification phase easier;

2. to extract from the high T.D.S. content waste waters the salts, some of which when mixed with fodder may be harmful while, at the same time, being excellent fertilizing agents;

3. the use of the remaining waste waters having a high concentration of organic substances, as additives for fodders.

These objects are reached by the process proposed by this invention, which comprises the following successive operational phases:

Automatic separation of the high T.D.S. content waste waters from those having a low T.D.S. content;

Mixing of the high T.D.S. content waste waters with strong acids or bases according to the composition of the waste waters, the acids or bases being added in quantities sufficient to form stable salts;

Filtration of the formed solution to eliminate insoluble substances and possible precipitates;

Concentration of the obtained solution by evaporation until the less soluble salts are saturated;

One or more crystallization steps of the concentrate with the therefrom ensuing separation of the mineral salts from the mother liquors having a high content of organic substances.

The process according to the present invention is based upon a series of studies regarding the composition of the major part of the waste waters of the agricultural, food-processing and food-preservation industries.

The analyses carried out have shown that:

A. The organic substances contained in such waste waters are particularly rich in nitrogenous compounds (proteins, amino acids, organic bases) and carbohydrates (sugars, starches, pentoses, cellulose derivatives);

B. They are rich in mineral cations, in particular potassium and ammonia (over 50%), followed by sodium, calcium and traces of other minerals;

C. The acid radicals, salifying these cations, are in general organic radicals having a low acid strength, unless the said cations are in the form of carbonates and bicarbonates.

The analyses of the substances contained in the waste waters show that these comprise organic substances suitable for animal feeding and mineral cations suitable for the production of fertilizers. Considering now that the mineral cations are present in the form of very soluble weak salts such as carbonates and organic salts, it is possible to shift the ionic equilibrium by means of the introduction of a strong acid with the ensuing formation of less soluble salts, that is salts which are easily separated out by simple crystallization.

Such acids must thus be sufficiently strong to form stable salts of low solubility with the cations which are present in the solution.

The acids which are particularly suitable for this process are in the order given sulphuric acid, phosphoric acid and nitric acid, alone as pure acid or mixed as acid waste solution obtained from working processes in the plant.

After the formation of the stable salts, the solution is subjected to the conventional concentration and crystallization operations which result in the formation of potassium and ammonium sulphates, phosphates or nitrates according to the acid which has been used.

Separating now the crystallized salts from the solution we obtain on the one hand fertilizer salts and on the other hand the mother liquors which are rich in high value nutritive compounds, directly usable as additives for animal fodders. That is, heavily polluted waters become useful products easily placed on the market.

The process proposed by the present invention consists therefore of a series of operations as follows:

1. Separation of high T.D.S. content waste waters from those of low T.D.S. content.

This step is automatically controlled by inserting into the waste water duct a measuring instrument:
- a. a conductivity meter if the electrolyte content of the solution is sufficiently high,
- b. a densimeter if the solution has a low electrical conductivity.

2. Mixing of the high T.D.S. content solution, diverted from the remaining waste waters, with a suitable quantity of a strong acid, then adding enough acid to displace the carbonates.

If the starting solution already contains an excess of acid radicals, a strong base must be added, preferably potassium or ammonium hydroxide.

3. Filtration of the high T.D.S. content solution for the purpose of eliminating any insoluble substance or any possible precipitate. For example, when the solution is rich in calcium, the adding of sulphuric acid will precipitate calcium sulphate.

4. Concentration of the high T.D.S. content solution until the less soluble salts are saturated.

5. Filtration of the high T.D.S. content solution to remove any substance precipitated during the concentration step.

6. Progressive crystallization of the salts contained in the solution having a high T.D.S. content by evaporation in vacuum of the solution and separation of the crystallization products by centrifugation.

7. Intermittent crystallization of the remaining salts by vacuum evaporation and cooling.

8. Separation of the salts which have crystallized out from the mother liquors which result now to be solutions having a concentration of nutritive organic substances.

BRIEF DESCRIPTION OF THE DRAWINGS

The chemical process, object of the present invention, is illustrated in the accompanying schmematic drawing showing a preferred embodiment thereof without being limited thereto.

DESCRIPTION OF THE PREFERRED EMBODIMENTS

In the drawing, 1 is the waste water outlet pipe of the factory with the waters being analyzed by means of the meters 2 automatically acting on a 3-way valve 3 conveying the high T.D.S. content waters to the chemical treatment station while the low T.D.S. content waters are conveyed to the biological purification plant through the pipe 4.

In the mixer 5 the solution is mixed with strong acids coming from the pipe 6; the mixing operation being controlled by means of a pH meter 7. The obtained solution is then filtered through the filter 8, concentrated in an evaporator 9, again filtered by passing it through the filter 10 and then conveyed in a continuous flow to the crystallizer 11. The formed crystals are separated by means of the centrifuge 12.

The residual mother liquors are again subjected to a crystallization step in 13 where the last crystals are formed. The mother liquors, after cooling in a cooler 14, are again centrifuged in a centrifuge 15.

The crystallized salts leaving the centrifuges 12 and 15 are now conveyed through the pipe 16 to the collection store.

The residual mother liquors after leaving the centrifuge 15 give organic compounds rich in nitrogenous and carbohydrated substances ready to be used as additives for fodder.

The proposed invention is particularly suitable for treating the high T.D.S. content wastes of sugar mills, alcohol distilleries, fermentation industries, as well as the waste waters coming from ion exchange plants, food-preserving industries, starch, dextrin and similar industries.

The process will now be still further illustrated by a few examples of industrial applications.

EXAMPLE 1

(Sugar mill)

A sugar mill having a sugar solution ion exchange resin demineralizing plant discharges about 10 m$^3$/h of waste water having a high T.D.S. content coming from the ion exchange resin regeneration. The cationic ion exchange resins normally are regenerated with sulphuric acid, the anionic ion exchange resins with ammonia, or potassium hydroxide or potassium carbonate according to the market requirements.

The waste waters containing potassium in the form of ammoniac potassium are separated as described hereinabove and mixed with wastes containing sulphuric acid and, if necessary, integrated with fresh sulphuric acid.

The solution of stable salts so obtained is now subjected to treatment by the chemical which is the object of the present invention and results in about 1000 kg/h of fertilizer salts (potassium or ammonium sulphates) and about 650 kg/h of an organic concentrates having a protein content of over 45%.

EXAMPLE 2

(Alcohol distillery)

An alcohol distillery discharges 5 m$^3$/h of waste waters having a high T.D.S. content in part already acidified with sulphuric acid. The waste waters having a high T.D.S. content are separated from the less polluted waters and treated as described hereinabove. The yield is about 200 kg/h of fertilizer salts and 100 kg/h of an organic concentrate with a protein content in excess of 30%.

EXAMPLE 3

(Fermentation industry)

For example, a factory making glutamic acid and sodium glutamate using the fermentation method, discharges about 7 m$^3$/h of a high T.D.S. content waste water containing large quantities of potassium and amino acids as fermentation by-products. These waste waters are treated according to the here described chemical process yielding about 140 kg/h of fertilizer salts and about 350 kg/h of organic concentrates with a protein content in excess of 50%.

The so conceived invention is susceptible of numerous modifications and variants within the range of the solution according to the claims as hereinbelow.

What we claim aand desire to secure by Letters Patent is:

1. A process for the extraction of fertilizer salts, on the one hand, and concentrates of organic substances having a high nutritive value, on the other hand, from industrial waste waters, comprising the following successive steps:

monitoring the T.D.S. cntent of the waste water;

automatically diverting waste waters of high T.D.S. content to the following additional steps from waste water of low T.D.S. which does not undergo the following additional steps;

mixing the waste waters of high T.D.S. content with strong acids or bases, according to the composition of the waste water, in a quantity sufficient to form stable salts of low solubility;

filtering the formed mixture to eliminate insoluble substances or precipitates;

concentrating the filtrate by evaporation until the less soluble salts are saturated;

crystallizing the concentrated filtrate at least once;

separating the crystallized mineral salts, for use as fertilizer salts, from the mother liquor which is the concentrate of organic substances having high nutritive value.

2. An extraction process according to claim 1, wherein said monitoring and diverting steps are carried out by means of a conductivity meter or a densimiter, depending on the chemical and physical characteristics of the wastes, the said instrument controlling automatically a flow control valve capable of directing and conveying only the high T.D.S. content waste waters to the following successive operational steps.

3. An extraction process according to claim 1, wherein the acids used in said mixing step comprise sulphuric acid, phosphoric acid or nitric acid, either as reagents or as waste solutions obtained from preceding working steps.

4. An extraction process according to claim 1, wherein the bases used in said mixing step comprise potassium hydroxide or ammoniac potassium, either as pure reagents or in waste solutions obtained from preceding working steps.

5. An extraction process according to claim 1, further including the step of filtering for a second time said filtrate after said concentrating step, to eliminate possible insoluble substances formed during the preceding concentrating step.

6. An extraction process in accordance with claim 1, wherein the waste waters being treated are waste waters of the agricultural, food-processing or food-preservation industries.

7. An extraction process in accordance with claim 1, further including the steps of using the mineral salts obtained from said separating step as fertilizer salts and using the mother liquor obtained from said separating step as additive for fodder.

8. An extraction process in accordance with claim 1, wherein said mixing step comprises mixing a sufficient amount of a sufficiently strong acid to shift the ionic equilibrium of the solution and form less soluble salts with the cations which are present in the solution.

* * * * *